United States Patent Office 3,595,836
Patented July 27, 1971

3,595,836
PROCESS FOR THE PRODUCTION OF A DIMENSIONALLY STABLE POLYESTER FILM AND ARTICLE THEREOF
Wolfgang Korneli, Walter Seifried, and Eberhard Werner, Wiesbaden-Biebrich, Germany, assignors to Kalle Aktiengesellschaft, Wiesbaden-Biebrich, Germany
No Drawing. Filed May 29, 1968, Ser. No. 732,864
Claims priority, application Germany, June 1, 1967, K 62,440
Int. Cl. B29c 25/00; C08c 19/00; D01d 5/12
U.S. Cl. 260—75         3 Claims

ABSTRACT OF THE DISCLOSURE

This invention relates to a planar, dimensionally stable polyethylene terephthalate film and a process for the production of the said planar, dimensionally stable polyethylene terephthalate film which comprises stretching an amorphous polyethylene terephthalate film, having a mean molecular weight less than 13,500, by at least 200 percent in orthogonal directions of the film plane at a temperature in the range of 85 to 95° C., with a force of not more than 0.5 kg./mm.$^2$, and then heating the film under tension to a temperature of at least 200° C. for at least five seconds.

---

The present invention relates to a process for the production of dimensionally stable polyethylene terephthalate films having improved flat-lying properties, in which an extruded molecularly unoriented film web is stretched in two orthogonal directions of the film plane and then thermoset by heating under tension.

After being stretched in orthogonal directions of the film plane and heat-set under tension, molecularly oriented polyethylene terephthalate films have excellent electrical, physical and chemical properties which render them suitable for use in many industrial fields.

However, experience has shown that these films shrink again when they are heated to temperatures above 100° C. under conditions free of tension, and their use for certain fields of application is considerably limited thereby. This is particularly true for their use as supporting materials in the graphic field, where extremely high requirements are made of the dimensional stability and flatness of films, since even minor shrinkages may jeopardize the accuracy of reproduction.

Dimensional changes caused by thermal stress lead to a deterioration of the flat-lying properties. Thermal stresses occur in particular when the films are subjected to higher temperatures during refining and after-treatment processes, e.g. in coating or vacuum-deposition procedures.

Numerous attempts have been made to produce polyester films the dimensions of which remain constant also at temperatures above 100° C. Thus, it is known, e.g., to improve the dimensional stability of plastic films by anticipating a substantial portion of the undesirable shrinking process by appropriate process steps at the end of the manufacturing process.

In some of the processes known for this purpose, the plastic film is subjected, with slight tension, to a thermal treatment of 0.5 to 5 minutes' duration, either at the temperature used for heat-setting and simultaneously with the heat-setting step, or at a temperature which is below that used for heat-setting, but still above 100° C., and in a separate heat-treatment step which follows heat-setting. These known processes are based on the principle that internal stresses in the film are relieved by heating, the application of slight tensile stresses from without serving the purpose of preventing a substantial deterioration of the flat-lying properties of the film. However, since the stresses present in the film are not constant over the entire film but are subject to often quite considerable variations, exterior tensile stresses differentiated according to their point of attack would have to be applied during heat treatment in order to completely eliminate stresses. Since this is not possible practically, this known process always yields films which are either only incompletely deshrunk, or are not completely flat. In addition thereto, an additional machine distance of considerable length is necessary when the heat-setting process is to be followed by a second heat-treatment, to which the film is to be subjected for a period of up to 5 minutes, and this renders the process considerably more expensive. Besides, it is not easy to maintain the tensile stress constant over such a long distance.

The present invention provides a process by which a polyethylene terephthalate film can be produced the dimensions of which are stable also at elevated temperatures, no thermal after-treatment of the already heat-set film at a specific film tension being necessary. In the process of the invention, a film web consisting of polyethylene terephthalate having a mean molecular weight less than 13,500 is stretched by at least 200 percent in both orthogonal directions at a temperature of 85 to 95° C. and a applied stress of not more than 0.5 kg./mm.$^2$ and then heated for at least 5 seconds to a temperature between 200 and 230° C. under a tension which maintains the film dimensions constant. The process of the invention may be performed by stretching the film simultaneously in both orthogonal directions.

The mean molecular weight of the polyethylene terephthalate film used, which is of importance for the invention, was calculated by the method of W. Griehl and S. Neue, published in "Faserforschung und Textiltechnik," vol. 5 (1954), page 423, from the specific viscosity found in a solution in a 60:40 mixture of phenol and tetrachloroethane at a concentration c=1 g./100 ml. solvent. In principle, all applied stress values ≤0.5 kg./mm.$^2$ may be employed for performing the process of the invention, but particularly favorable results are achieved with applied stresses below 0.2 kg./mm.$^2$. Normally, it is desirable for the heat-setting procedure according to the invention, to select the temperatures as high as possible in order to produce the highest possible degree of crystallinity in the film and, as a result thereof, to maintain the shrinking tendency as low as possible.

At higher temperatures, the shrinking stress of the films caused by such higher temperatures works against the dimensional stability of the films and causes them to shrink. The shrinking stress and the mechanical strength of the film depend upon the tensile stress applied during the stretching operation and, as already mentioned, on the degree of crystallinity attained by the films.

Now it has been found that, when the same tensile stress and the same conditions of fixing are applied, the shrinkage of the films depends upon the density of the polyester raw material in that, with increasing density, the shrinkage of the films decreases and that, under identical conditions of heat-setting, the density of the film obtained is inversely proportional to the molecular weight of the polyester used. Besides the stretching and fixing conditions of polyester films, the molecular weight of the polyester used for the film is thus of decisive influence upon the shrinkage and, consequently, upon the dimensional stability of biaxially stretched and heat-set polyester films under the influence of elevated temperatures.

In order to impart, by stretching, as good a mechanical strength to films of lower molecular weight polyester material, as have higher molecular weight polyester films which have been stretched under optimum conditions, it is necessary, because of the influence of the molecular weight of the polymeric raw material on the rate of stretching of the films, to conduct the stretching process, for optimum strength, at temperatures which render it possible to employ applied stresses of the order otherwise employed when films of higher molecular weight polyesters are stretched at the same rate at elevated temperatures.

According to the process of the invention, the films are produced by melting a polyester material having a mean molecular weight less than 13,500 in an extruder at temperatures ranging from 260 to 300° C., preferably from 275 to 290° C., and producing a film which is then cooled on a roll at temperatures between 20 and 60° C., preferably between 20 and 30° C., stretching the amorphous base film thus obtained at temperatures between 85 and 95° C., preferably at 90 or 91° C., in orthogonal directions of the film plane at a stretching ratio of 1:3 to 1:4, and fixing it for a period of at least 5 seconds at temperatures between 200 and 240° C., preferably between 220 and 230° C., under conditions which prevent shrinkage of the film. The heat-setting process may be considerably extended beyond 5 seconds, e.g. to 20 seconds, without adverse effects.

In the following, the production of specific films according to the present invention (1) will be described by reference to two examples, and the physical characteristics measured of these films will be compared with the characteristics of films (2) which were not produced in accordance with the present invention as far as one essential parameter, i.e. the molecular weight, is concerned.

EXAMPLE 1

Polyester films (1) and (2) were produced by extruding polyester materials at 285° C. and cooling the extruded films to 30° C., using for the production of film (1) a polyester with a mean molecular weight of 11,300 and for the production of film (2) a polyester with a means molecular weight of 17,500. Two samples of each of the amorphous films (1) and (2) were tested.

Of the two samples of equal molecular weight taken from film (1) and film (2), one in each case is stretched by 300 percent in orthogonal directions at higher temperatures (91° C., for sample 1 and 100° C. for sample 2), and the other at lower temperatures (83° C. for sample 1 and 92° C. for sample 2). In the case of the higher temperatures (100° C. and 91° C., respectively) the applied stress is 0.15 kg./mm.$^2$, and in the case of the lower stretching temperatures (92° C. and 83° C., respectively), the applied stress is 0.90 and 0.91 kg./mm.$^2$, respectively. The films are then fixed for 10 seconds at a temperature of 200° C. under conditions which prevent shrinkage of the films.

For determining the shrinking tendency of the films produced as described above, the films are heated in air for a period of 5 minutes to a temperature of 150° C. under conditions free of tension, and the residual shrinkage in the films is then measured.

The stretching temperatures and applied stresses employed for stretching the films, and the measured characteristics of the films are listed in Table I below.

TABLE I

| A | B, °C. | C, kg./mm.$^2$ | D, kg./mm.$^2$ | E, percent | F, g./cm.$^3$ |
|---|---|---|---|---|---|
| Film (1)...... 11,300 | 83 | 0.91 | 18.5 | 1.0 | 1.383 |
|  | 91 | 0.15 | 11.0 | 0.3 | 1.393 |
| Film (2)...... 17,500 | 92 | 0.90 | 18.0 | 2.2 | 1.386 |
|  | 100 | 0.15 | 11.5 | 1.0 | 1.387 |

NOTE.—A=Mean molecular weight; B=Stretching temperature; C=Yield stress; D=Strength at 50% elongation; E=Shrinkage 5 minutes/150° C.; F=Density of film.

EXAMPLE 2

Polyester films (1) and (2) were produced by extruding polyester materials at 285° C. and cooling the extruded films to 30° C., using for the production of film (1) a polyester having a mean molecular weight of 11,300 and for the production of film (2) a polyester having a mean molecular weight of 17,500. One sample each is taken from the amorphous films (1) and (2) and then biaxially stretched, first in the longitudinal direction, employing a applied stress of 0.1 kg./mm.$^2$ both in the case of film (1) and of film (2), and then in the orthogonal direction of the film plane at a applied stress of 0.47 kg./mm.$^2$ for film (1) and 0.50 kg./mm.$^2$ in the case of film (2), the temperature used for stretching being 90° C. in the case of film (1) and 100° C. in the case of film (2). After the films had been stretched in this manner to four times their original length and width, they were fixed for 10 seconds at a temperature of 200° C. under conditions which prevented a shrinkage of the films.

For determining the shrinking tendency of the films produced as described above, the films are heated in air for a period of 5 minutes to a temperature of 150° C. under conditions free of tension, and the residual shrinkage of the films is then measured.

The stretching temperatures and applied stresses employed for stretching the films and the measured characteristics of the films are listed in Table II below.

TABLE II

|  |  | H-1 |  | H-2 |  |  |  |
|---|---|---|---|---|---|---|---|
| A | C, kg./mm.$^2$ | B, °C. | C, kg./mm.$^2$ | B, °C. | D, kg./mm.$^2$ | E, percent | F, g./cm.$^3$ |
| Film (1).... 11,300 | 0.1 | 90 | 0.47 | 90 | 10.4 | 0.1 | 1.393 |
| Film (2).... 17,500 | 0.1 | 100 | 0.50 | 100 | 10.0 | 1.2 | 1.387 |

NOTE.—A=Mean molecular weight; B=Stretching temperature; C=Applied stress; D=Strength at 50% elongation; E=Shrinkage 5 min./150° C. F=Density of film; H-1=First stretching operation; H-2=Second stretching operation.

The physical characteristics listed in the table show clearly that it is possible by the process of the invention to produce stretched polyester films which are distinguished by an excellent resistance to shrinking at elevated temperatures.

The production of films in accordance with the invention is a particular improvement in the art because it can be performed in a simple manner, without additional process steps and installations, and as a continuous process. By these advantages, the process of the invention is clearly distinguished from prior art processes.

It will be obvious to those skilled in the art that many modifications may be made within the scope of the present

What is claimed is:

1. A process for the production of a planar, dimensionally stable polyethylene terephthalate film which comprises stretching an amorphous polyethylene terephthalic film, having a mean molecular weight in the range of about 11,300 to 13,500, by at least 200 percent in orthogonal directions of the film plane at a temperature in the range of 85 to 95° C., with a force of not more than 0.5 kg./mm.$^2$, and then heating the film under tension to a temperature of at least 200° C. for at least five seconds.

2. A process according to claim 1 in which the film is simultaneously stretched by at least 200 percent in both directions of the film plane with a force of not more than 0.2 kg./mm.$^2$, and then heated under tension to a temperature of at least 200° C. for at least five seconds.

3. A planar, dimensionally stable polyethylene terephthalate film prepared according to the process of claim 1.

References Cited

UNITED STATES PATENTS

| | | | |
|---|---|---|---|
| 2,465,319 | 3/1949 | Whinfield et al. | 260—75 |
| 2,823,421 | 2/1958 | Scarlett | 264—289 |
| 2,851,733 | 9/1958 | Pangonis et al. | 260—75 |
| 2,968,065 | 1/1961 | Gronholz | 260—75 |
| 2,995,779 | 8/1961 | Winter | 264—210 |
| 3,040,005 | 6/1962 | Bernhardt et al. | 264—176 |

ROBERT F. WHITE, Primary Examiner

J. R. THURLOW, Assistant Examiner

U.S. Cl. X.R.

264—210, 235, 289, 346